(12) United States Patent
Chatani

(10) Patent No.: US 8,108,319 B2
(45) Date of Patent: Jan. 31, 2012

(54) SYSTEM AND METHOD FOR CONTROLLING ACCESS TO COMPUTER READABLE CONTENT USING DOWNLOADABLE AUTHENTICATION

(75) Inventor: Masayuki Chatani, Foster City, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 1810 days.

(21) Appl. No.: 10/649,042

(22) Filed: Aug. 26, 2003

(65) Prior Publication Data

US 2005/0050208 A1  Mar. 3, 2005

(51) Int. Cl.
*G06Q 20/00* (2006.01)
(52) U.S. Cl. ............................ 705/66; 705/51
(58) Field of Classification Search ............ 705/51, 705/66
See application file for complete search history.

(56) References Cited

U.S. PATENT DOCUMENTS

| | | | |
|---|---|---|---|
| 5,677,953 A | | 10/1997 | Dolphin ............................ 380/4 |
| 5,892,900 A | * | 4/1999 | Ginter et al. ..................... 726/26 |
| 5,933,497 A | * | 8/1999 | Beetcher et al. ................ 705/59 |
| 6,076,078 A | * | 6/2000 | Camp et al. ..................... 705/65 |
| 6,192,349 B1 | * | 2/2001 | Husemann et al. ............. 705/65 |
| 6,240,401 B1 | * | 5/2001 | Oren et al. ....................... 705/40 |
| 6,507,727 B1 | * | 1/2003 | Henrick ....................... 455/3.06 |
| 6,829,596 B1 | * | 12/2004 | Frazee ............................. 705/66 |
| 7,020,636 B2 | * | 3/2006 | Ohmori et al. .................. 705/51 |
| 7,028,009 B2 | * | 4/2006 | Wang et al. ..................... 705/51 |
| 7,040,987 B2 | * | 5/2006 | Walker et al. ................... 463/42 |
| 7,089,425 B2 | * | 8/2006 | Chan ............................. 713/189 |
| 7,191,153 B1 | * | 3/2007 | Braitberg et al. ............... 705/51 |
| 7,198,571 B2 | * | 4/2007 | LeMay et al. ................... 463/25 |
| 7,206,765 B2 | * | 4/2007 | Gilliam et al. .................. 705/51 |
| 7,213,742 B1 | * | 5/2007 | Birch et al. .................... 235/375 |
| 7,225,160 B2 | * | 5/2007 | Stefik et al. ..................... 705/51 |
| 7,370,016 B1 | * | 5/2008 | Hunter et al. ................... 705/57 |
| 7,480,381 B2 | * | 1/2009 | Kahn et al. ..................... 380/201 |
| 2002/0098888 A1 | * | 7/2002 | Rowe et al. ..................... 463/39 |
| 2002/0104019 A1 | * | 8/2002 | Chatani et al. ................ 713/201 |
| 2002/0116283 A1 | * | 8/2002 | Chatani ........................... 705/26 |
| 2002/0126846 A1 | * | 9/2002 | Multerer et al. .............. 380/251 |
| 2002/0184500 A1 | * | 12/2002 | Maritzen et al. .............. 713/170 |
| 2003/0055735 A1 | * | 3/2003 | Cameron et al. ................ 705/26 |
| 2003/0083950 A1 | * | 5/2003 | Ofiesh ............................. 705/26 |
| 2003/0123670 A1 | | 7/2003 | Shimada et al. .............. 380/281 |
| 2003/0162593 A1 | * | 8/2003 | Griswold ........................ 463/39 |
| 2004/0139335 A1 | * | 7/2004 | Diamand et al. ............. 713/189 |

FOREIGN PATENT DOCUMENTS

| | | |
|---|---|---|
| EP | 1 229 476 A2 | 8/2002 |
| EP | 1229476 A2 * | 8/2002 |
| WO | WO 01/18725 A1 | 3/2001 |

\* cited by examiner

*Primary Examiner* — Jamie Kucab
(74) *Attorney, Agent, or Firm* — Martine Penilla Group LLP

(57) ABSTRACT

An invention is provided for controlling access to computer readable media is disclosed. The method includes receiving a digital authentication ticket, which includes a digital code, from a client device using a computer system that includes particular computer readable content. A determination is made as to whether the digital authentication ticket corresponds to the particular computer readable content. Access is provided to the particular computer readable content when the digital authentication ticket corresponds to the particular computer readable content. Conversely, access to the particular computer readable content is prevented when the digital authentication ticket does not correspond to the particular computer readable content.

16 Claims, 6 Drawing Sheets

SYSTEM AND METHOD FOR CONTROLLING ACCESS TO COMPUTER READABLE CONTENT USING DOWNLOADABLE AUTHENTICATION

BACKGROUND OF THE INVENTION

1. Field of the Invention

This invention relates generally to computer content utilization, and more particularly to a method for controlling access to computer readable content using downloadable authentication.

2. Description of the Related Art

Currently, interactive content systems, such as game consoles, provide utility and entertainment mechanisms to individuals worldwide. For example, interactive content systems allow users to view digital videodiscs (DVDs), play interactive entertainment software, and browse the Internet. In addition, interactive content systems provide exciting learning environments through educational interactive software.

FIG. 1 is a block diagram showing a typical prior art interactive content system 100. The prior art interactive content system 100 generally includes a central processing unit (CPU) 102 coupled to a system bus 104, which connects a plurality of system components. For example, the system bus 104 often is connected to a graphics processing unit (GPU) 106, an operational request source 108, a memory 110, a removable media drive 112, and video/audio output circuitry 114.

In operation, removal media such as a compact disc (CD) or digital videodiscs (DVD) is placed into the removal media drive 112, which reads data from the CD and transfers program information to the memory 110. The CPU 102, in conjunction with the GPU 106, executes the program instructions from memory to execute the program. In addition, the operational request source 108 typically is in communication with a user input device, such as a game controller, remote controller, keyboard, or other device capable of receiving and transferring user input data to the interactive content system 100. Output from the program executing on the CPU 102 generally is provided to the video/audio output circuitry 114 for presentation, typically on television or other monitor and speaker system.

In this manner, users are able to interact with the information presented to them via the operational request source 108. As can be appreciated, removable media, such as a CD or DVD, needs to be distributed to users of the interactive content system 100 in order for the users to access the content of the CD or DVD. In order for content developers to charge for content on CDs or DVDs, the CDs or DVDs generally must be sold to the end users. That is, the user generally must pay for the CD, and then the CD is provided to the user for use in the interactive content system 100.

However, this paradigm restricts many forms of distribution. CDs represent a cheap form of media content distribution. That is, the cost of manufacturing a CD is a fraction of the cost of developing the content stored on the CD. Moreover, CDs and DVDs can store a large amount of data, for example, an average CD can store over 650 megabytes (MB) of data. As a result, CDs and DVDs are a desirable method of data distribution. Unfortunately, the conventional paradigm for purchasing CDs, DVDs, and other removable media generally is not conducive to mass distribution efforts because the user must first purchase the removable media before physically obtaining the CD or DVD in order for distributors, developers, and others to profit from the transaction.

Although online forms of data distribution can be utilized, downloading 650 MB of data for the average user is a tremendous task. For example, a typical digital subscriber line (DSL) connection generally allows data transfer rates in the range of about 500-800 KiloBits per second (kbps). Thus, even a fast online connection can require several hours to download the amount of data provided on a single CD. Moreover, DVDs generally allow even greater storage capacity, thus further increasing the time required to download an equivalent amount of data.

In view of the foregoing, there is a need for a content distribution method that allows a user to physically obtain content via removable media, such as CDs and DVDs, without payment, yet allows developers to charge for the actual usage of the content. The method should provide the advantages of low cost, high capacity data distribution of physical removable media distribution, without requiring payment prior to physically distributing the media.

SUMMARY OF THE INVENTION

Broadly speaking, the present invention fills these needs by providing techniques for controlling access to computer readable media using downloadable authentication. Embodiments of the present invention provide computer readable content, for example on computer readable media, which must be unlocked prior to usage. An authentication code, for example in the form of a digital authentication ticket, is utilized to unlock the content. In one embodiment, a method for controlling access to computer readable media is disclosed. The method includes receiving a digital authentication ticket, which includes a digital code, from a client device using a computer system that includes particular computer readable content. A determination is made as to whether the digital authentication ticket corresponds to the particular computer readable content. Access is provided to the particular computer readable content when the digital authentication ticket corresponds to the particular computer readable content. Conversely, access to the particular computer readable content is prevented when the digital authentication ticket does not correspond to the particular computer readable content. In one aspect, the digital authentication ticket can be transmitted to the client device in response to receiving a request for the digital authentication ticket. Also, the request for the digital authentication ticket can be processed such that a fee is charged to the user. Optionally, wireless transmission techniques can be used to transmit the digital authentication from the payment server to the client device, and from the client device to the computer system.

In an additional embodiment, a system is disclosed for controlling access to computer readable media. The system includes a payment server capable of receiving a request for a digital authentication ticket corresponding to particular computer readable content. The payment server is further capable of transmitting the digital authentication ticket to the client device. A computer system having the particular computer readable content also is included. The computer system is capable of receiving the digital authentication ticket from the client device. The computer system includes program instructions that prevent access to the particular computer readable content when the digital authentication ticket does not correspond to the particular computer readable content. Optionally, the system can include a game server that stores a plurality of digital authentication tickets. In this aspect, the game server can transmit the digital authentication ticket to the payment server. Generally, the computer system is located locally to the client device when the client device transmits the digital authentication ticket to the computer system. As above, wireless transmission techniques can be used to transmit the digital authentication from the payment server to the client device, and from the client device to the computer system.

In a further embodiment, a computer program embodied on a computer readable medium is disclosed. The computer program includes computer instructions that receive a digital authentication ticket from a client device using a computer system having particular computer readable content. As above, the digital authentication ticket includes a digital code. In addition, computer instructions are included that determine whether the digital authentication ticket corresponds to the particular computer readable content. Computer instructions also are included that prevent access to the particular computer readable content when the digital authentication ticket does not correspond to the particular computer readable content. Similar to above, the digital authentication ticket can be transmitted from a payment server to the client device in response to receiving a request for the digital authentication ticket. In addition, the digital authentication ticket can be transmitted from a game server, which stores a plurality of digital authentication tickets, to the payment server. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for controlling access to computer readable media using downloadable authentication. In general, embodiments of the present invention provide content, for example on computer readable media, which must be unlocked prior to usage. As used in the present description, content refers to any form of computer readable data such as digital movie data, computer program instructions, image data, or any other form of data capable of being utilized by a computer processor. An authentication code, for example in the form of a digital authentication ticket, is utilized to unlock the content. Thus, physical distribution of the content on computer readable media can be separate from distribution of the authentication code for unlocking the content. In this manner, content can be mass distributed to users. Then, to utilize the content, individual users can purchase the authentication code for unlocking the content.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
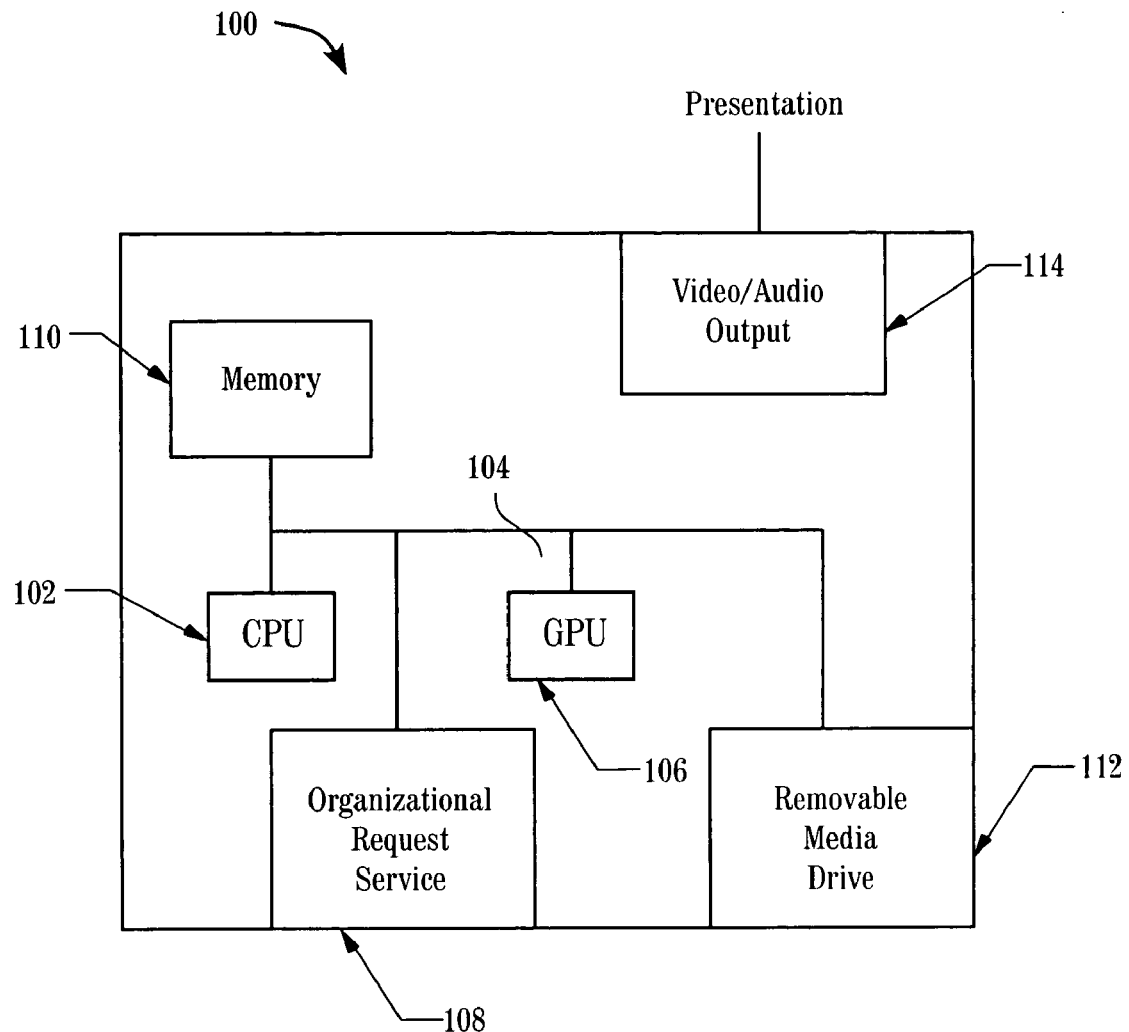
FIG. 1 is a block diagram showing a typical prior art interactive content system.
Figure 2:
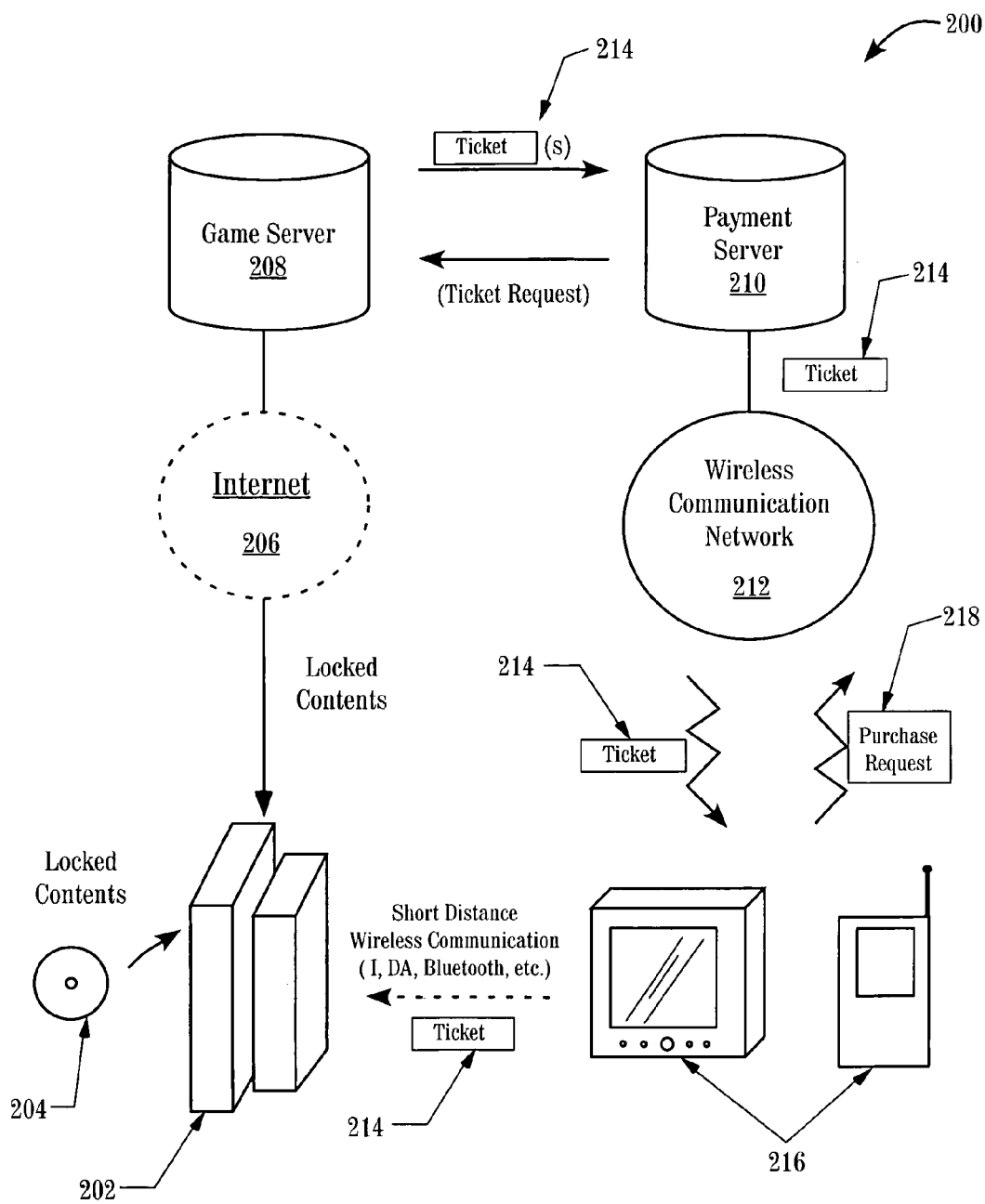
FIG. 2 is a diagram showing an authentication system for controlling access to computer readable media content, in accordance with an embodiment of the present invention.

FIG. 1 was described in terms of the prior art. FIG. 2 is a diagram showing an authentication system 200 for controlling access to computer readable media content, in accordance with an embodiment of the present invention. The authentication system 200 includes a game server 208 in communication with a payment server 210. In addition, an interactive content system 202 can be in communication with the game server 208 via a wide area network such as the Internet 206. However, it should be noted that the interaction content system 202 is not required to be in communication with the game server 208.

In communication with the payment server 210, is a client device 216, which can be any device capable of communicating with the payment server 210, such as a personal digital assistant (PDA), cell phone, laptop computer, or desktop computer. In one embodiment, the client device 216 is in communication with the payment server 210 via a wireless communication network 212. For example, the wireless communication network 212 can be a cellular phone network, wherein numerous base stations are used for communication, each base station covering a cell (small geographic area), which slightly overlaps adjacent cells at the borders. The multiple cells, combined with low power transmitters, allow the same frequencies to be reused with different conversations in different cells within the same city or locale.

The authentication system 200 controls access to computer readable media content through the use of digital authentication tickets 214. Specifically, locked computer readable media content, which cannot be accessed by a user without authorization, is distributed to the interactive content system 202. Distribution can be achieved, for example, using removable media 204, such as CDs or DVDs, or via the wide area network 206. As mentioned above, CDs represent a cheap form of media content distribution, since the cost of manufacturing a CD is a fraction of the cost of developing the content stored on the CD. Moreover, CDs and DVDs can store a large amount of data, for example, an average CD can store over 650 MB of data. As a result, CDs and DVDs are a desirable method of data distribution.

In addition, as mentioned above, the locked computer readable content can be provided to the interactive content system 202 via the Internet. For example, in one embodiment, the locked computer readable media content is stored on the game server 208. The locked computer readable media content is made available to users in some manner, such as via a Web page, or through a media content access system specific to the particular interactive content system 202. In either case, the locked computer readable media content is downloaded to the interactive content system 202 by way of the wide area network 206.

To avoid requiring the user first purchase the removable media 204 prior to physically obtaining the removable media 204, embodiments of the present invention distribute the computer readable media content locked. That is, the user cannot fully utilize the computer readable media content until the computer readable media content is unlocked. For example, in one embodiment, locked media content cannot be accessed in any manner until the media content is unlocked. In a further embodiment, the user is provided limited access to the locked media content until the media content is unlocked, at which time full access to the media content is granted.

To provide access to locked computer readable media content, embodiments of the present invention utilize digital authentication tickets 214. When the user desires access to locked computer readable media, the user employs the client device 216 to access the payment server 210 via the wireless communication network 212. Specifically, the client device 216 transmits a purchase request 218 to the payment server 210. Generally, the purchase request identifies the user and the particular computer readable media content to unlock. In addition, the purchase request includes payment information, such as credit card data, user account data, or other information that allows the payment server 210 to charge a fee or otherwise process the digital authentication ticket 214. However, it should be noted that the purchase request can include any information that facilitates the purchase transaction, assists the content provider in identifying and tracking content usage, or any other data that may be desired by the content provider.

Once received, the payment server 210 processes the purchase request. For example, the payment server 210 can charge the user's account or credit card a predefined fee for the digital authentication ticket 214. In one embodiment, the content provider can determine pricing for the locked computer readable media content. For example, the content provider can set a fixed price for access to the locked computer readable media content, or a variable price, such as a flexible price depending on geographical area, group membership, or any other criteria.

After successfully processing the purchase request 218, the payment server 210 obtains an appropriate digital authentication ticket 214. In one embodiment, as illustrated in FIG. 2, the payment server 210 obtains the digital authentication ticket 214 from the game server 208, which can store a plurality of digital authentication tickets 214 for use in unlocking locked computer readable media content. Each digital authentication ticket 214 generally comprises a digital code that is utilized for unlocking content, as described in greater detail subsequently. Optionally, the payment server 210 can obtain a plurality of digital authentication tickets 214 in advance from the game server 208. In this manner, the payment server 210 can process a plurality of purchase requests 218 internally before obtaining additional digital authentication tickets 214 from the game server 208.

The payment server 210 then provides the digital authentication ticket 214 to the to the client device 216 via the wireless communication network 212. In one embodiment, the payment server 210 can be located in a mobile Electronic Contract (EC) system, which allows commerce through a mobile device, such as cell phone or PDA. Mobile EC systems provide mobility to the user, allowing the user to perform transactions from most locations. In addition, mobile EC systems can provide personalized and location aware services to be processed. In this manner, the client device 216 can safely store personalized information that can be taken anywhere the client device 216 is located. As a result, digital authentication tickets 214 can be purchased almost anytime, and almost anywhere the user takes the client device 216.

Upon receipt, the client device 216 stores the digital authentication ticket 214 in memory. The client device 216 can thereafter be utilized to transmit the digital authentication ticket 214 to the interactive content system 202 in order to unlock the corresponding locked computer readable media content. Transmission of the digital authentication ticket 214 can be accomplished either using a wireless transmission means, such as Infrared data association (IrDA) or Bluetooth, or through a physical connection, such as a USB port. Generally, the digital authentication ticket 214 expires once it is utilized to unlock the computer readable media. This prevents from unlocking content on additional interactive content systems 202. The interactive content system 202 can then examine the digital authentication ticket 214 to verify that the user has purchased the right to utilize the locked computer readable media content, as described in greater detail below.

Figure 3:
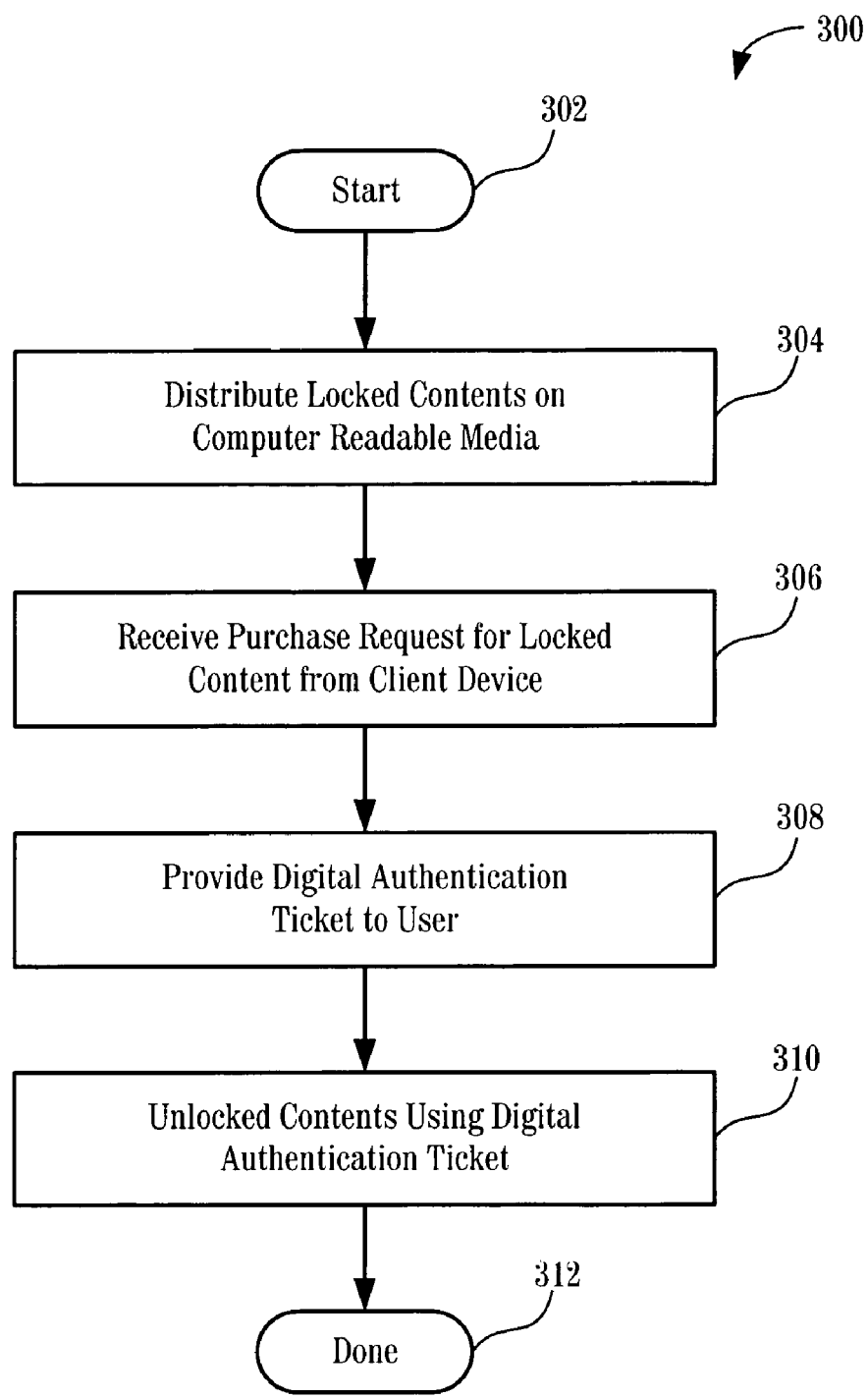
FIG. 3 is a flowchart showing a method for controlling access to computer readable media using downloadable authentication, in accordance with an embodiment of the present invention.

FIG. 3 is a flowchart showing a method 300 for controlling access to computer readable media using downloadable authentication, in accordance with an embodiment of the present invention. In an initial operation 302, preprocess operations are performed. Preprocess operation can include, for example, developing computer readable media content, locking the content such that a particular digital authentication ticket is required to unlock the content, and other preprocess operations that will be apparent to those skilled in the art after a careful reading of the present disclosure.

In operation 304, locked computer readable media content is distributed. Generally, the locked computer readable media content is distributed using computer readable media, such as CDs or DVDs. However, as described above, the locked computer readable media content can be distributed through a wide area network, such as the Internet, using the game server. Thus, embodiments of the present invention can provide content on computer readable media that must be unlocked prior to usage. An authentication code, for example in the form of a digital ticket, is utilized to unlock the content. Thus, physical distribution of the content on computer readable media can be separate from distribution of the authentication code for unlocking the content. In this manner, content can be mass distributed to users, yet still allow content developers to be compensated for usage of the content.

A payment request is received from a client device for the locked content, in operation 306. When a user desires access to the locked computer readable content, the user employs the client device to transmit a purchase request to the payment server. Generally, the purchase request identifies the locked content and provides user information that facilitates the purchase transaction. For example, the purchase request can identify a particular game software product that is locked and further provide the user's credit card information to facilitate fee processing for the locked content.

In operation 308, a digital authentication ticket is provided to the user. After processing the purchase request, the payment server transmits a corresponding digital authentication ticket to the client device. The client device then stores the received digital authentication ticket for later use in unlocking the locked computer readable media content. In this manner, the user can purchase access to locked content anytime and anywhere the client device has access to the wireless communication network. When the user is ready to access the locked content, the user employs the client device to provide the digital authentication ticket to the interactive content system, as described next.

The digital authentication ticket is utilized to unlock the locked computer readable media content, in operation 310. The stored digital authentication ticket is transmitted from the client device to the interactive content system in order to unlock the corresponding locked computer readable media content. The interactive content system then examines the digital authentication ticket to verify that the user has purchased the right to utilize the locked computer readable media content. Once the digital authentication ticket is verified, the computer readable media content is unlocked such that the content is available for use by the user. Post process operations are performed in operation 312. Post process operations can include, for example, utilization of the unlocked content and other post process operations that will be apparent to those skilled in the art after a careful reading of the present disclosure.

Figure 4:
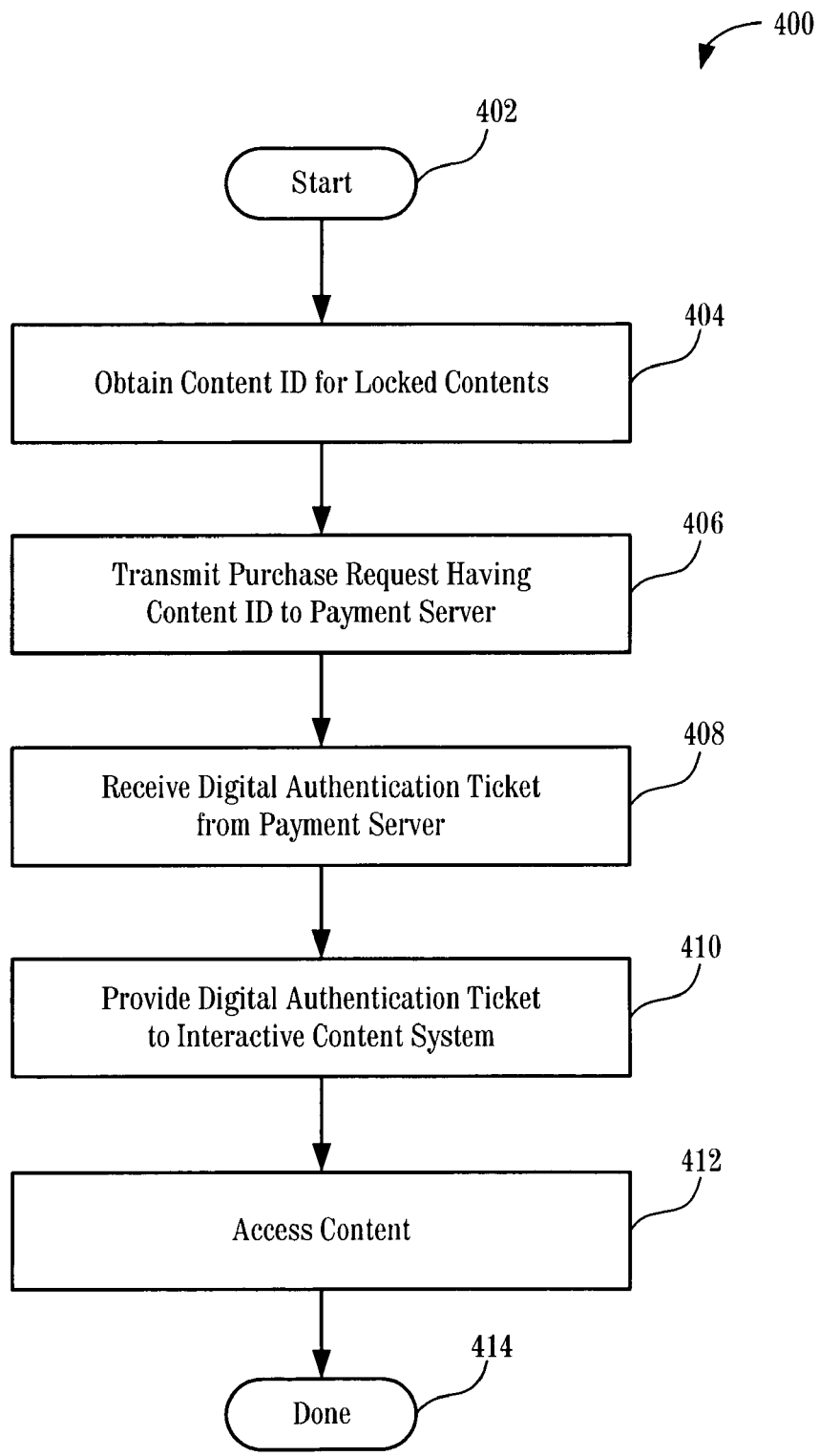
FIG. 4 is a flowchart showing a method for client side operations for controlling access to computer readable media using downloadable authentication, in accordance with an embodiment of the present invention.

FIG. 4 is a flowchart showing a method 400 for client side operations for controlling access to computer readable media using downloadable authentication, in accordance with an embodiment of the present invention. In an initial operation 402, preprocess operations are performed. Preprocess operations can include, for example, selecting particular computer readable media content and other preprocess operations that will be apparent to those skilled in the art after a careful reading of the present disclosure.

In operation 404, the content identification for locked content is obtained. Generally, the content identification can be anything that identifies the locked content, such as an alphanumeric code that identifies the locked content. The payment server and/or game server utilizes the content identification to determine which digital authentication ticket should be provided to the client device.

In operation 406, a purchase request having the content identification is transmitted to the payment server. Generally, the purchase request identifies the user and the particular computer readable media content to unlock via the content identification. In addition, the purchase request includes payment information, such as credit card data, user account data, or other information that allows the payment server to charge a fee or otherwise process the digital authentication ticket. However, it should be noted that the purchase request can include any information that facilitates the purchase transaction, assist the content provide in identifying and tracking content usage, or any other data that may be desired by the content provider.

A digital authentication ticket is received from the payment server, in operation 408. Upon receipt, the client device stores the digital authentication ticket in memory. As mentioned above, the client device generally is a mobile client device such as cell phone or PDA. However, any device capable of communication with the payment server can be utilized, such as a desktop computer. In either case, the memory of the client device is utilized to store the received digital authentication ticket.

In operation 410, the digital authentication ticket is provided to the interactive content system. The client device transmits the digital authentication ticket to the interactive content system in order to unlock the corresponding locked computer readable media content. As mentioned previously, transmission of the digital authentication ticket can be accomplished either using a wireless transmission means, such as IrDA or Bluetooth, or through a physical connection, such as a USB port. Generally, the digital authentication ticket expires once it is utilized to unlock the computer readable media. This prevents from unlocking content on additional interactive content systems.

The content then is accessed in operation 412. The interactive content system examines the digital authentication ticket to verify that the user has purchased the right to utilize the locked computer readable media content. Once verified, the computer readable content is unlocked and the user is permitted to access and utilize the content. Post process operations are performed in operation 414. Post process operations can include, for example, transmitting further purchase requests to unlock additional content and other post process operations that will be apparent to those skilled in the art after a careful reading of the present disclosure.

Figure 5:
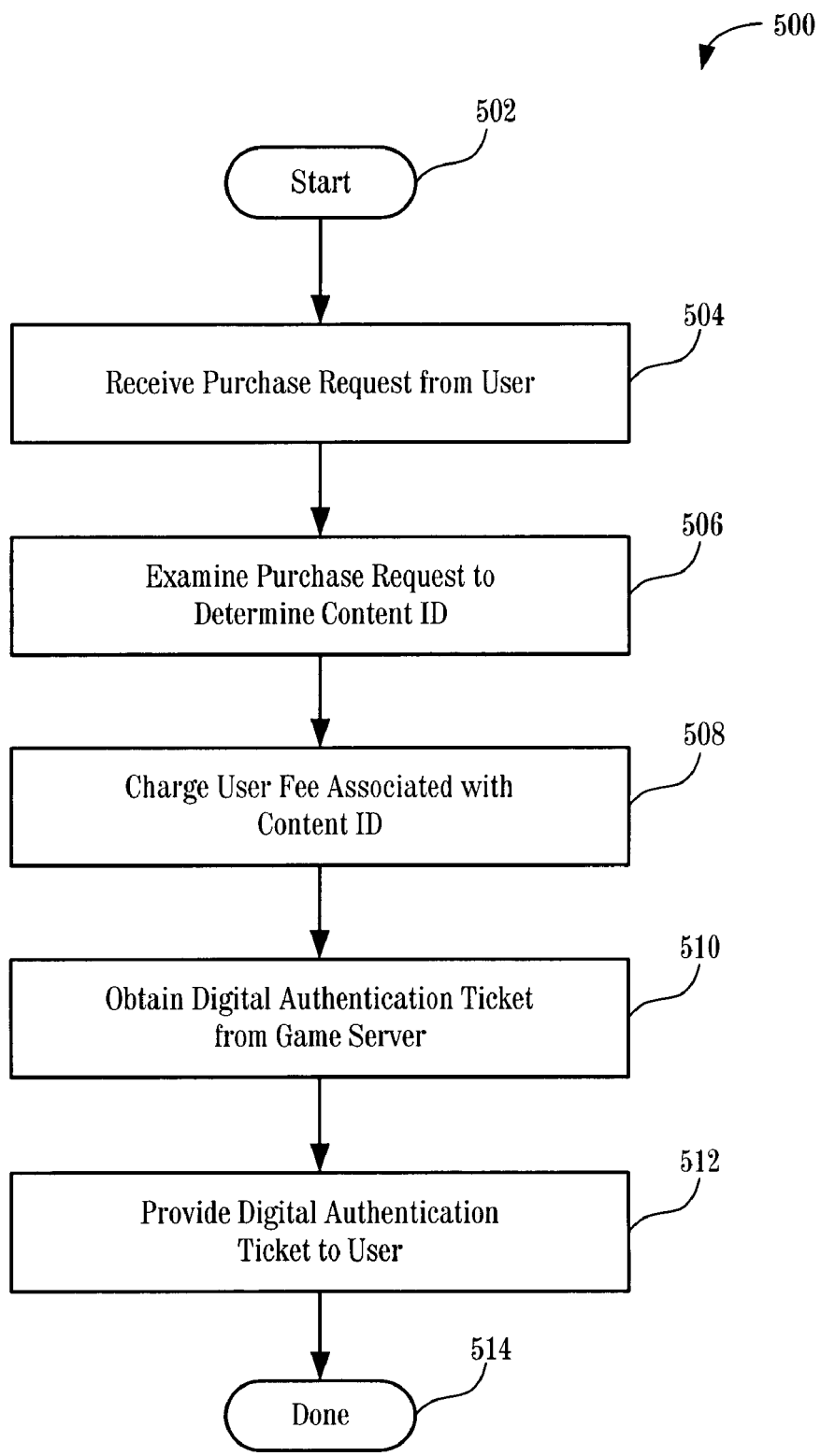
FIG. 5 is a flowchart showing a method for server side operations for controlling access to computer readable media using downloadable authentication, in accordance with an embodiment of the present invention.

FIG. 5 is a flowchart showing a method 500 for server side operations for controlling access to computer readable media using downloadable authentication, in accordance with an embodiment of the present invention. In an initial operation 502, preprocess operations are performed. Preprocess operations can include, for example, generating digital authentication tickets for unlocking particular locked content, optionally providing a plurality of digital authentication tickets to the payment server, distributing locked computer readable content, and other preprocess operations that will be apparent to those skilled in the art after a careful reading of the present disclosure.

In operation 504, a purchase request is received from a user. The user employs a client device to transmit the purchase request to the payment server. Generally, the purchase request identifies the user and the particular computer readable media content to unlock. In addition, the purchase request includes payment information, such as credit card data, user account data, or other information that allows the payment server to charge a fee or otherwise process the digital authentication ticket. However, it should be noted that the purchase request can include any information that facilitates the purchase transaction, assist the content provide in identifying and tracking content usage, or any other data that may be desired by the content provider.

The purchase request then is examined to determine the content identification (ID), in operation 506. The content identification can be anything that identifies the locked content, such as an alphanumeric code that identifies the locked content. The payment server and/or game server utilize the content identification to determine which digital authentication ticket should be provided to the client device.

In operation 508, the user is charged a fee associated with the content ID. Generally, the purchase request identifies the user and the particular computer readable media content to unlock via the content identification. In addition, the purchase request includes payment information, such as credit card data, user account data, or other information that allows the payment server to charge a fee or otherwise process the digital authentication ticket. However, it should be noted that the purchase request can include any information that facilitates the purchase transaction, assists the content provider in identifying and tracking content usage, or any other data that may be desired by the content provider. The payment server can charge the user's account or credit card a predefined fee for the digital authentication ticket. In one embodiment, the content provider can determine pricing for the locked computer readable media content. For example, the content provider can set a fixed price for access to the locked computer readable media content, or a variable price, such as a flexible price depending on geographical area, group membership, or any other criteria.

The payment server obtains a digital authentication ticket from the game server, in operation 510. After successfully processing the purchase request, the payment server obtains an appropriate digital authentication ticket. In one embodiment, the payment server can obtain the digital authentication ticket from the game server after processing the purchase request. As described above, the game server can store digital authentication tickets for use in unlocking locked computer readable media content. Each digital authentication ticket generally comprises a digital code that is utilized for unlocking content, as described in greater detail subsequently. Optionally, the payment server can obtain a plurality of digital authentication tickets in advance from the game server. In this manner, the payment server can process a plurality of purchase requests internally before obtaining additional digital authentication tickets from the game server.

In operation 512, the digital authentication ticket is provided to the user. The payment server provides the digital authentication ticket to the to the client device via the wireless communication network. As described previously, the payment server can be located in a mobile EC system, which allows commerce through a mobile device, such as cell phone or PDA. Mobile EC systems provide mobility to the user, allowing the user to perform transactions from most locations, and can provide personalized and location aware services to be processed. In this manner, the client device can safely store personalized information that can be taken anywhere the client device is located. As a result, digital authentication tickets can be purchased almost anytime, and almost anywhere the user takes the client device. Post process operations are then performed in operation 514. Post process operations can include, for example, further purchase request processing, replenishing digital authentication ticket supplies via the game server, and other post process operations that will be apparent to those skilled in the art after a careful reading of the present disclosure.

Figure 6:
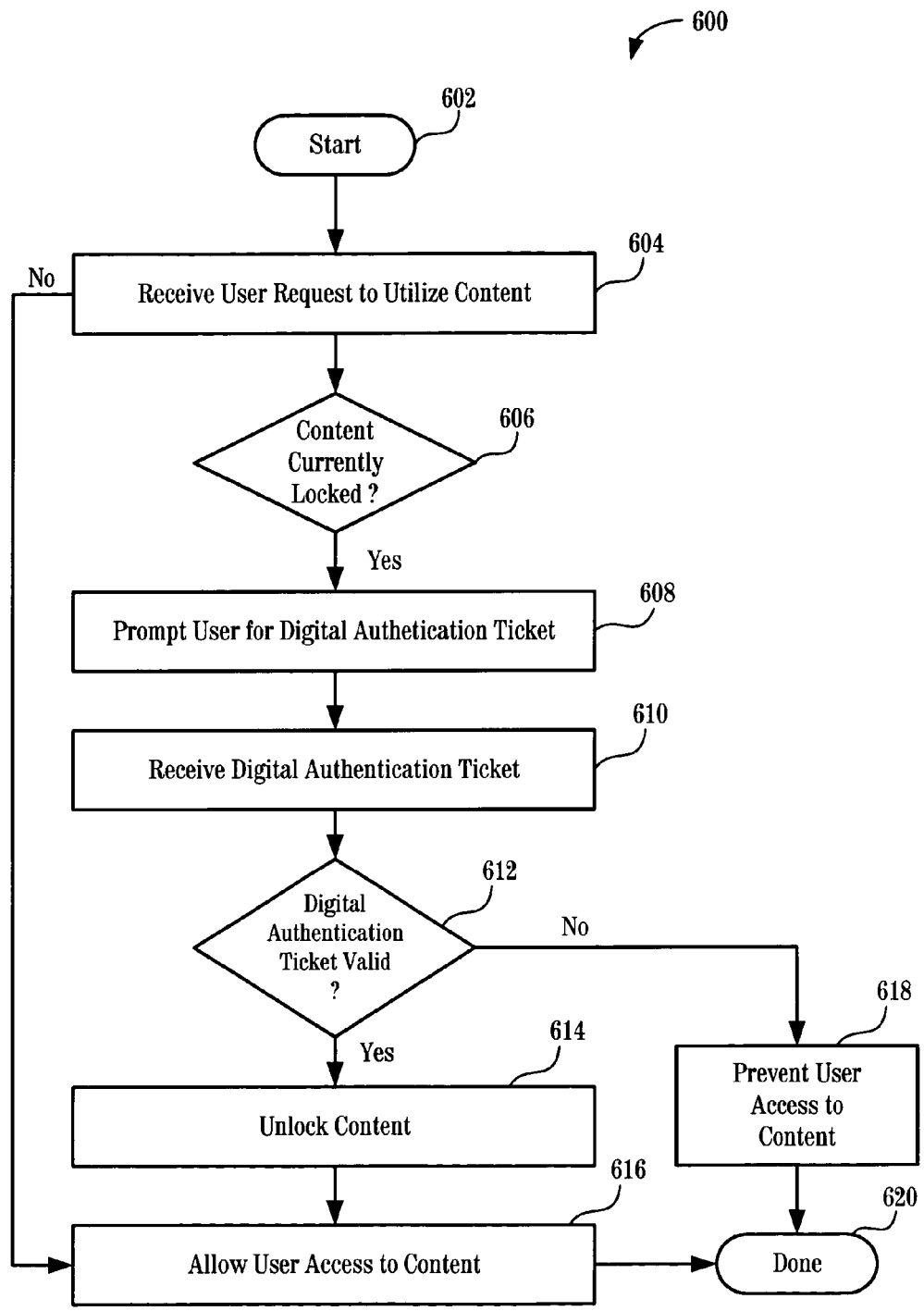
FIG. 6 is flowchart showing a method for processing digital authentication tickets for controlling access to computer readable media using downloadable authentication, in accordance with an embodiment of the present invention.

FIG. 6 is flowchart showing a method 600 for processing digital authentication tickets for controlling access to computer readable media using downloadable authentication, in accordance with an embodiment of the present invention. In an initial operation 602, preprocess operations are performed. Preprocess operations can include, for example, loading locked computer readable media content onto the interactive content system, configuring the interactive content system to operate with particular client devices, and other preprocess operations that will be apparent to those skilled in the art after a careful reading of the present disclosure.

In operation 604, the interactive content system receives a request to utilize particular computer readable content from a user. Typically, the user employs an input device, such as a keyboard or game controller, to request access to particular content. For example, a menu can be displayed to the user when the content is loaded onto the system. The user can then select items on the menu to request access to particular computer readable media content.

A decision is then made, in operation 606, as to whether the requested content is currently locked. As mentioned previously, embodiments of the present invention distribute the computer readable media content locked to avoid requiring the user first purchase the removable media prior to physically obtaining the removable media. That is, the user cannot fully utilize the computer readable media content until the computer readable media content is unlocked. For example, in one embodiment, locked media content cannot be accessed in any manner until the media content is unlocked. In a further embodiment, the user is provided limited access to the locked media content until the media content is unlocked, at which time full access to the media content is granted. Thus, in operation 606, the locked status of the requested content is checked. If the requested content is currently locked, the method 600 continues to operation 608. Otherwise, the method 600 branches to operation 616.

If the requested content is currently locked, the user is prompted for a digital authentication ticket, in operation 608. For example, a window can be displayed to the user that requests the user for the appropriate digital authentication ticket for the locked content. In this manner, the user is reminded that a digital authentication ticket is required to access the locked content. Thus, if the user does not currently possess the correct digital authentication ticket for the requested software, the user can be informed where to obtain the digital authentication ticket, and optionally, the fee for the digital authentication ticket.

In operation 610, the digital authentication ticket is received from the user. As described previously, a client device generally is utilized to transmit a digital authentication ticket to the interactive content system in order to unlock the corresponding locked computer readable media content. Transmission of the digital authentication ticket can be accomplished either using a wireless transmission device or system, such as IrDA, WiFi (802.11x), or Bluetooth, or through a physical connection, such as a USB port.

A decision is then made as to whether the received digital authentication ticket is valid for the requested content, in operation 612. The interactive content system examines the digital authentication ticket to verify that the user has purchased the right to utilize the locked computer readable media content. If the received digital authentication ticket is valid for the requested content, the method 600 continues to operation 614. Otherwise, the method 600 branches to operation 618.

In operation 614, the requested content is unlocked. As mentioned above, embodiments of the present invention utilize computer readable media content that is locked to avoid requiring the user first purchase the removable media prior to physically obtaining the removable media. The user cannot fully utilize the computer readable media content until the computer readable media content is unlocked. Thus, in operation 614, the interactive content system unlocks the requested content.

The user then is allowed to access the content, in operation 616. Once the requested content is unlocked, the user is permitted to access the content. Optionally, the content can be listed as unlocked after the digital authentication ticket is verified such that the user can continue to access the content after the initial use. In an additional embodiment, the content can be unlocked for one use, thereafter requiring additional digital authentication tickets for subsequent access to the content.

When the digital authentication ticket is not valid, the user is prevented from accessing the requested content, in operation 618. Typically, the user will be informed that an invalid digital authentication ticket was transmitted to the system for the requested content. Post process operations are then performed in operation 620. Post operations can include, for example, further requests for content, further digital authentication ticket validation, and other post process operations that will be apparent to those skilled in the art after a careful reading of the present disclosure.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for controlling access to computer readable content, comprising the operations of:

receiving a digital authentication ticket, obtained by a client device and saved in memory of the client device, before being transmitted to a computer system having particular computer readable content, wherein the digital authentication ticket includes a digital code, the digital code being separate from the particular computer readable content and the digital authentication ticket being received by the client device at a location separate from a location of the particular computer readable content;

transferring the digital authentication ticket wirelessly from the client device to the computer system;

determining, at the computer system, whether the digital authentication ticket is defined to unlock the particular computer readable content when the digital authentication ticket is obtained;

allowing access to the particular computer readable content at the computer system when the digital authentication ticket unlocks the particular computer readable content; and preventing access to the particular computer readable content at the computer system when the digital authentication ticket does not unlock the particular computer readable content;

wherein the client device is connected to a communication network and obtains the digital authentication ticket via the communication network, the client device being capable of obtaining the digital authentication ticket anywhere the client device has access to the communication network.

2. A method as recited in claim 1, further comprising the operation of transmitting the digital authentication ticket to the client device in response to receiving a request for the digital authentication ticket.

3. A method as recited in claim 2, further comprising the operation of processing the request for the digital authentication ticket, wherein the processing includes charging a fee to a user.

4. A method as recited in claim 2, wherein the request is received using a payment server located remotely from the client device.

5. A method as recited in claim 4, further comprising the operation of transmitting the digital authentication ticket from a game server to the payment server, the game server storing a plurality of digital authentication tickets.

6. A method as recited in claim 1, wherein the computer system is located locally to the client device.

7. A method as recited in claim 1, wherein the digital authentication ticket is transmitted wirelessly from a payment server to the client device.

8. A system for controlling access to computer readable media, comprising:

a payment server programmed to receive a request for a digital authentication ticket that corresponds to particular computer readable content, a client device communicating with the payment server, the client device configured to receive transmission of the digital authentication ticket upon confirming payment, the client device having memory for storing the digital authentication ticket, wherein the digital authentication ticket is received separate from the particular computer readable content; and a computer system having the particular computer readable content that is in a locked state, the computer system receiving the digital authentication ticket wirelessly from the memory of the client device, where the digital authentication ticket has digital code for unlocking the particular computer readable content, wherein the computer system includes program instructions that prevent access to the particular computer readable content when the digital authentication ticket does not correspond to the particular computer readable content;

wherein the client device is connected to a communication network and obtains the digital authentication ticket via the communication network separately from the particular computer readable content, the client device being capable of obtaining the digital authentication ticket anywhere the client device has access to the communication network.

9. A system as recited in claim 8, wherein the payment server processes the request for the digital authentication ticket, the processing including charging a fee to a user.

10. A system as recited in claim 8, wherein the payment server is located remotely from the client device.

11. A system as recited in claim 8, further comprising a game server storing a plurality of digital authentication tickets, wherein the game server transmits the digital authentication ticket to the payment server.

12. A system as recited in claim 8, wherein the computer system is located locally to the client device.

13. A system as recited in claim 8, wherein the digital authentication ticket is transmitted wirelessly from the payment server to the client device.

14. A system as recited in claim 8, wherein the computer readable content is stored on a computer readable medium.

15. A system as recited in claim 11, wherein the game server transmits the computer readable content to the computer system.

16. A method for granting access to media content, comprising the operations of:

communicating with a server through a wireless device, the communicating enabling the wireless device to request and purchase a digital authentication ticket from the server;

receiving the digital authentication ticket at the wireless device and saving to memory of the wireless device;

transmitting wirelessly the digital authentication ticket from the memory of the wireless device to a game console having particular media content that is locked, wherein the particular media content is received by the game console separately from the digital authentication ticket, where the digital authentication ticket includes a digital code;

determining whether the digital authentication ticket is defined to unlock the particular media content at the game console;

allowing access to the particular media content at the game console when the digital authentication ticket unlocks the particular media content; and invalidating the digital code after allowing access to the particular media to prevent unlocking of additional media content without purchase;

wherein the client device is connected to a communication network and obtains the digital authentication ticket via the communication network separately from the particular computer readable content, the client device being capable of obtaining the digital authentication ticket anywhere the client device has access to the communication network.

* * * * *